United States Patent [19]

Laplante

[11] Patent Number: 5,065,471

[45] Date of Patent: Nov. 19, 1991

[54] ANTIFREEZE SELF-SPRAYING AND -WARMING WINDSHIELD WIPER

[76] Inventor: Sylvain Laplante, 180, 37E Avenue, App. 2, P.O. Box 476, Quebec Saint-Zotique, Canada, J0P 1Z0

[21] Appl. No.: 610,961

[22] Filed: Nov. 9, 1990

[51] Int. Cl.[5] .............................. B60S 1/46; B60S 1/38
[52] U.S. Cl. ............................... 15/250.04; 15/250.09; 15/250.36; 15/250.41; 219/202
[58] Field of Search ........... 15/250.04, 250.01, 250.09, 15/250.06, 250.07, 250.05, 250.02, 250.03, 250.08, 250.36, 250.41; 219/202, 203

[56] References Cited

U.S. PATENT DOCUMENTS

| | | | |
|---|---|---|---|
| 1,647,319 | 11/1927 | Shultz et al. | 15/250.04 |
| 1,868,783 | 7/1932 | Williams | 15/250.04 |
| 1,873,118 | 8/1932 | Gooley et al. | 15/250.09 |
| 2,012,814 | 8/1935 | Herzog | 15/250.09 |
| 2,055,946 | 9/1936 | Schmonsky | 15/250.09 |
| 2,318,529 | 5/1943 | Soiler | 15/250.09 |
| 2,500,010 | 3/1950 | Schoor | 15/250.09 |
| 2,536,740 | 1/1951 | Johnson et al. | 15/250.09 |
| 2,865,040 | 12/1958 | Homm | 15/250.06 |
| 2,869,166 | 1/1959 | Eaves | 219/203 |
| 3,119,587 | 6/1963 | Lamb | 15/250.09 |
| 3,408,078 | 5/1968 | Linker | 15/250.05 |
| 3,447,186 | 6/1969 | Senkewich | 219/203 |
| 3,757,379 | 9/1973 | Benson | 15/250.04 |
| 3,854,161 | 12/1974 | Benson | 15/250.04 |
| 3,936,901 | 2/1976 | Theckston | 15/250.04 |
| 4,152,808 | 8/1979 | Andregg | 15/250.07 |
| 4,192,038 | 3/1980 | Klein et al. | 15/250.04 |
| 4,339,839 | 7/1982 | Knights | 15/250.04 |
| 4,497,083 | 2/1985 | Nielsen, Jr. et al. | 15/250.06 |
| 4,754,517 | 7/1988 | Aldous | 15/250.04 |

FOREIGN PATENT DOCUMENTS

| | | | |
|---|---|---|---|
| 284159 | 10/1928 | Canada. | |
| 294619 | 11/1929 | Canada. | |
| 962813 | 2/1975 | Canada. | |
| 3504549 | 8/1986 | Fed. Rep. of Germany | 15/250.04 |
| 862481 | 3/1941 | France | 219/203 |
| 1116544 | 5/1956 | France | 219/203 |
| 2329481 | 5/1977 | France | 15/250.04 |
| 0183250 | 9/1985 | Japan | 15/250.04 |
| 0054671 | 11/1932 | Norway | 15/250.09 |
| 0527321 | 9/1976 | U.S.S.R. | 15/250.09 |
| 413551 | 7/1934 | United Kingdom | 15/250.09 |

Primary Examiner—Philip R. Coe
Assistant Examiner—Gary K. Graham
Attorney, Agent, or Firm—Pierre LesPérance

[57] ABSTRACT

A wiper for an automobile windshield glass pane. The elongated rubber wiper defines an anchoring bead and a blade integral to the head. The blade has a lip portion and a lengthwise U-shape channel defining a mouth about the lip portion, so that a pair of spaced lips be defined. A U-shape metal casing is embedded into the blade U-channel, and is heated by a wire made from a material having a high electric resistance and through which runs an electric current provided by the car battery. A hose is frictionally engaged into the U-casing lengthwisely thereof, and connected to the antifreeze liquid tank under the car hood. The hose has a number of bores, for passage of the antifreeze towards the windshield through the channel mouth. The wire casing will warm the antifreeze liquid in the hose and the wiping element including its blade as well as its bead.

3 Claims, 2 Drawing Sheets

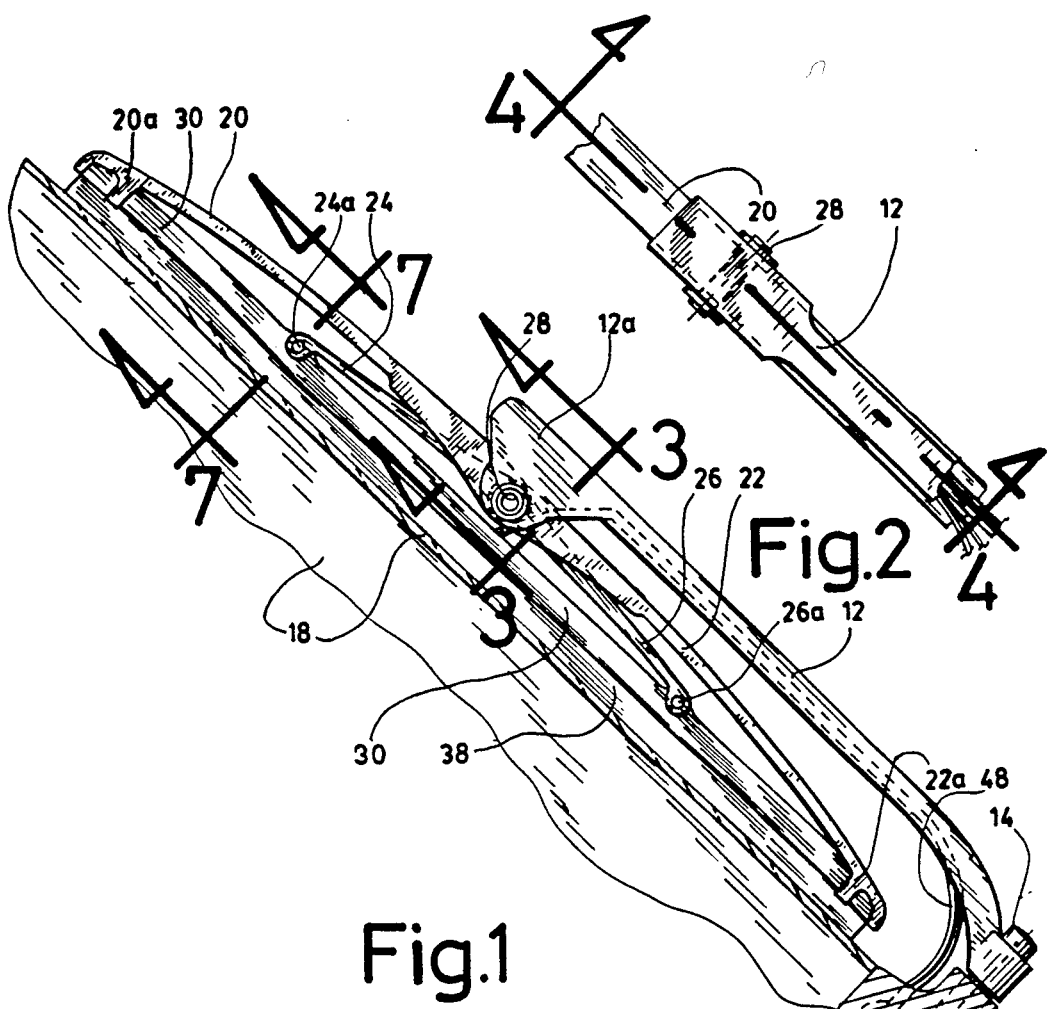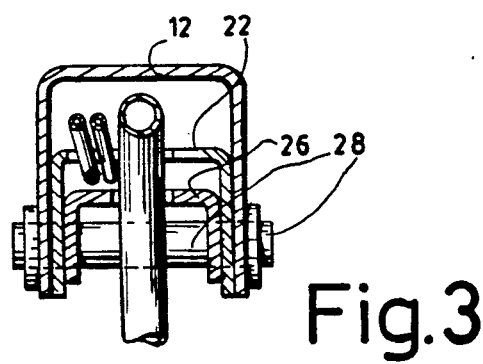

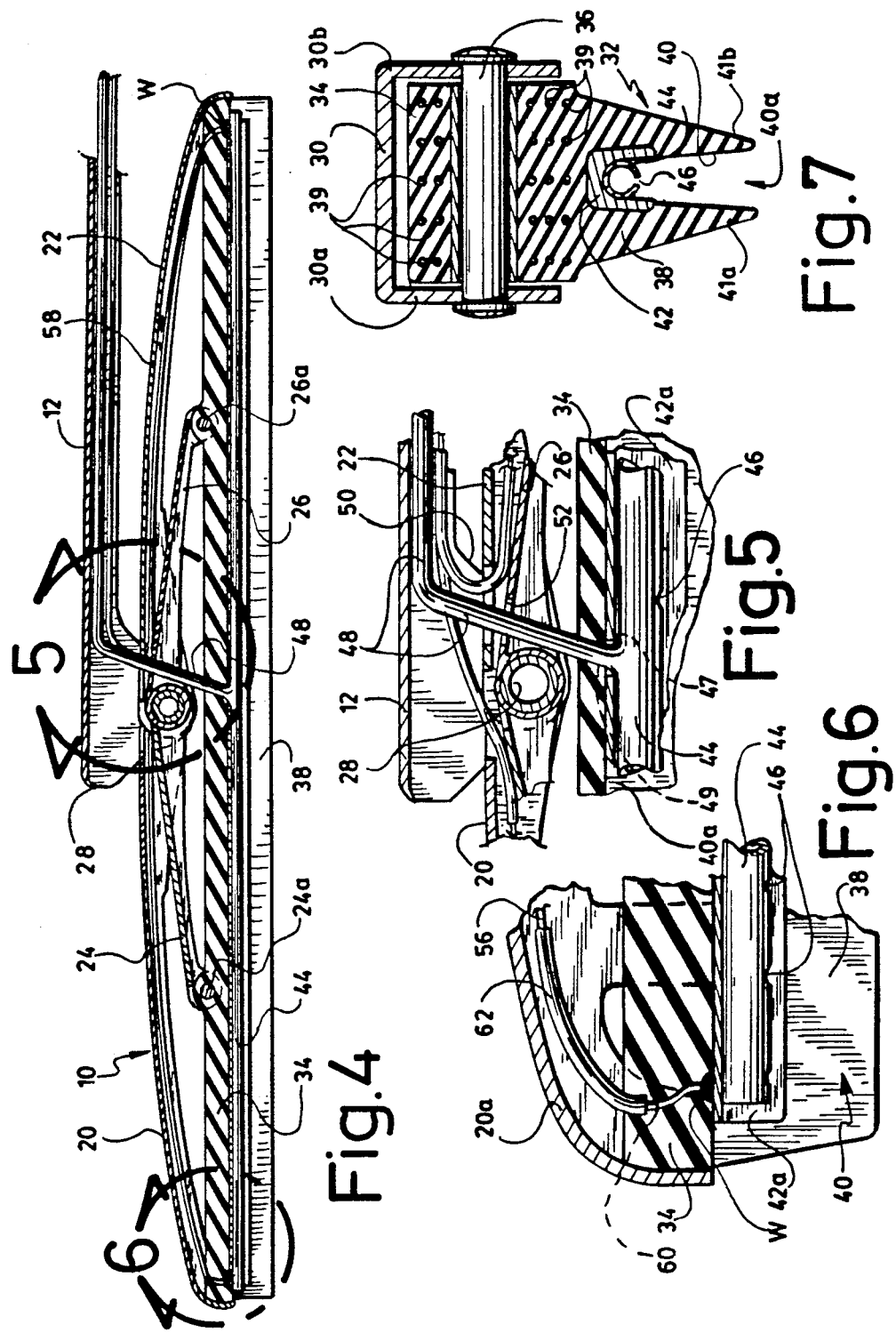

ANTIFREEZE SELF-SPRAYING AND -WARMING WINDSHIELD WIPER

FIELD OF THE INVENTION

This invention relates to the field of automobile accessories for use in winter time.

BACKGROUND OF THE INVENTION

Conventional liquid cleaning means for enabling a motorist to clean the windshield panel of his automobile while in motion on the road, includes a nozzle mount anchored to the vehicle chassis proximate the lower edge of the windshield pane. The liquid is sprayed in an upward and rearward direction. The wiper assembly then wipes the windshield surface having been sprayed with the cleaning fluid.

It is recognized in the art that the orientation of the fluid nozzle is critical to the efficiency of the wiper assembly-based, windshield cleaning system. A slight factory-made maladjustment can make a big difference. Moreover, a suitable nozzle orientation may be effective for a given, limited range of speed only. Other drawbacks concern the relative position of the nozzle mount, being in a corner at the rear edge section of the automobile hood and at the bottom edge section of the windshield pane, and which will therefore be prone to become clogged by external contaminants. This is especially the case in winter in Canada, where snowfalls will produce snow/ice which may melt during daylight and then freeze during night-time. The windshield antifreeze nozzle mount being a downwardly extending cavity in this area, water may engage therein and can eventually freeze at and thus seal the outlet area.

What is more, the conventional rubber blade of the wiper assembly can also become encrusted with a mixture of ice and snow, thus considerably decreasing its efficiency on the windshield glass pane. Various patents have been directed to the heating of the wiper rubber blade: see for instance canadian patents 284,159; 294,619, and 962,813; as well as U.S. Pat. Nos. 3,408,678 and 4,152,808. A major drawback of these patents is that they are limited to heating the bead of the wiper rubber blade, i.e. the anchoring means for anchoring the wiping blade to the wiper frame: this is clearly apparent for example from FIG. 3 of the last-mentioned patent. Hence, the efficiency thereof is reduced, because the blade per se, which engages the windshield surface to be wiped, is not as such directly heated (although it could eventually be warmed by conduction).

OBJECTS OF THE INVENTION

The gist of the invention is to address the drawbacks mentioned in the prior art chapter.

An important object of the invention is to increase the efficiency of automobile wipers.

A corollary object of the invention is to improve safety during handling of an automobile on the road in freezing conditions.

SUMMARY OF THE INVENTION

In accordance with the objects of the invention, there is disclosed a wiper for an automobile windshield glass pane. The elongated rubber wiper defines an anchoring bead and a blade integral to the bead. The blade has a lip portion and a lengthwise U-shape channel defining a mouth about the lip portion, so that a pair of spaced lips be defined. A U-shape metal casing is embedded into the blade U-channel, and is heated by a wire made from a material having a high electric resistance, and through which runs an electric current provided by the car battery. A hose is frictionally engaged into the U-casing lengthwisely thereof, and connected to the antifreeze liquid tank under the car hood. The hose has a number of bores, for passage of the antifreeze towards the windshield through the channel mouth. The wire casing will warm the antifreeze liquid in the hose and the wiping element including its blade as well as its bead.

More specifically, there is disclosed a wiper assembly for use in wiping a smooth, substantially flat, rigid surface and in concurrently cleaning same with a liquid solution, said wiper assembly comprising: (a) a main, rigid, elongated frame, destined to be displaced relative to said flat surface; (b) an elongated, flexible, wiping element, made from a thermally conducting material and defining an inner anchoring bead, fixedly secured to said main frame, and an outer blade, integral to said bead and having a lengthwise free end lip portion destined to frictionally engage and slidingly move along said flat surface to be cleaned; wherein said blade includes a lengthwise cavity or channel defining a mouth opening about said blade lip portion, wherein a pair of spaced free end lips are defined; (c) liquid spraying means, adjustably feeding a liquid solution onto said flat surface; and (d) warming means, adjustably warming at least said blade; wherein said warming means are installed within a substantial lengthwise portion of said blade channel spacedly from said mouth thereof.

Preferably, said liquid spraying means includes a spray member, fixedly releasably engaged lengthwisely into said blade channel spacedly from said channel mouth and destined to spray a liquid towards said flat surface through said channel mouth, and a liquid feeding means, for feeding a liquid to said spary member.

Profitably, the walls of said blade channel diverge from each other towards said channel mouth, to improve the guidance of the liquid sprayed toward said flat surface to be cleaned.

Advantageously, said warming means consists of a rigid U-casing, made from thermally conductive material and anchoringly embedded into said blade lengthwisely within said blade channel, and a source of heat, directly heating said conductive U-casing. The spray member could then include an elongated hose, made from a thermally conductive material and closed at its ends and fixedly releasably engaged into the lengthwise channel defined by said warming means U-casing; and a number of through-bores, made lengthwisely of said hose and directed towards said channel mouth; wherein said warming means U-casing further warms the hose by conduction through its wall and thus warms the liquid solution circulating through said hose.

Preferably, said spray member hose is anchored within said channel by friction-fit, releasably locking engagement.

Profitably, said liquid feeding means consists of a branch duct, fluidingly merging at one end with an intermediate section of said hose and operatively connected at the other end to a source of liquid.

Advantageously, said liquid is a liquid solution having a freezing point below a temperature ranging between about 275 to 230 degrees Kelvin.

To promote long useful lifetime for the present wiping element, it is envisioned that said main frame, said blade, said warming means U-casing and said hose should preferably be of respectively decreasing lengths.

Said hose could be made from a flexible material and said substantially flat surface to be sprayed onto by said liquid could be the windshield glass pane of an automobile, said glass pane being outwardly convex; and further including pressure applying and distributing linkage means, cooperating with said main frame and with said blade for bending the flexible hose with the flexible blade to adjustably conform to the outwardly convex windshield glass pane during the motion of the wiping element relative to said windshield pane.

It is envisioned that said source of heat could include at least one wire, made from a material of high electrical resistance so that its temperature increases when an electrical current passes therethrough, said wire being electrically connected to said thermally conductive U-casing and being fed with electricity by an electrical power source; wherein said wire extends thicknesswisely through said wiping element anchoring bead, so that said warming means warms not only the liquid circulating in the hose and the blade of the wiping element, but also the anchoring bead of the wiping element.

BRIEF DESCRIPTION OF THE DRAWINGS

FIG. 1 is a side edge view of a windshield wiper assembly, constructed in accordance with the teachings of the invention, and shown in operative position on a windshield glass pane being in fragmentary section for clarity of the view;

FIG. 2 is a top edge view of the intermediate section of the windshield wiper;

FIG. 3 is a cross-sectional view about line 3—3 of FIG. 1;

FIG. 4 is an enlarged sectional view of the wiper about line 4—4 of FIG. 2;

FIGS. 5-6 are enlarged views of the areas within circles 5 and 6 respectively of FIG. 4; and FIG. 7 is an enlarged, cross-section along line 7—7 of FIG. 1.

DETAILED DESCRIPTION OF THE INVENTION

The wiper 10 conventionally includes a main arm 12, endwisely fixedly mounted to a rotatable shaft 14 which is journalled into the frame 16 of a vehicle (not shown). Shaft 14 is at the lower edge of that vehicle windshield and at the rear edge of the hood thereof, whereas the frame overlies the windshield glass pane 18. Shaft 14 is rotatable in alternating fashion, so that arm 12 will oscillate or translate over the windshield 18 upon power being applied to the stud 14, in the known fashion.

Two pairs of linkage legs 20, 22 and 24, 26 are endwisely connected to the outer end 12a of main arm 12 (opposite stud 14), about a common pivotal axis 28 which is orthogonal to the axis of stud 14. Legs 20, 22 are fixedly connected at their outer ends 20a, 22a (opposite central axis 28) to the two extremities of an elongated, flexible or resilient, blade-carrying frame 30, while legs 24, 26 are pivotally connected at their outer ends 24a, 26a to sections of frame 30 intermediate their respective inner ends and the central axis 28.

Frame 30, which may be cross-sectionally U-shape (FIG. 7), carries within its lengthwise U-channel an elastomeric, waterproof wiping element 32. Wiping element 32 includes: an inner section or bead 34, located in between the legs 32a, 32b of blade 32, and being anchored to U-frame 30 into its channel by e.g. rivets 36; and an outer section or blade 38, projecting outwardly from the U-frame channel and integral to inner section 34. Inner rubber section 34 is preferably reinforced by a number of lengthwise, rigid members, e.g. metallic wires 39.

Legs 20-26 constitute pressure-applying and distributing linkages, that continuously bias the rubber strip 38 against the window 18, particularly when the main arm 12 oscillates under rotating bias from the power stud 14.

All of the above is well known and need not be detailed further.

Accordingly with the invention, the rubber blade 38 is lengthwisely slit to form a lengthwise U-shape channel at 40. Thus, two spaced, substantially parallel lips 41a, 41b are formed on the opposite sides of the channel 40, about the free end section of the blade section 38 of the wiping element 32. Channel 40 defines a mouth 40a between the tips of the blade lips 41a, 41b.

An elongated U-shape casing 42 is engaged into the bottom or base 40a of channel 40, being anchoringly embedded in position into the rubber blade 32 (FIG. 7). Casing 42 is accordingly slightly larger in width than that of the channel 40. Casing 42 must be made from a thermally conductive material, e.g. a suitable metallic alloy.

Elongated casing 42 defines a cross-sectionally U-shape channel 42a opening towards the channel mouth 40a, for engagement by a fluid-tight hose 44. Hose 44 is of such a diameter as to snugly fit by friction fit, releasable locking engagement, within the U-channel 42a of the metallic casing 42. Hose 44 should be made from a thermally conductive material, as well as the wiping element 32. Hose 44 includes a plurality of small, fluid outlets 46, all directed toward the channel mouth 40a through the mouth of the metallic U-casing 42. Hose 44 is closed at its opposite ends.

Preferably, the coextensive frame members 20, 22, the rubber blade 38, the metallic U-casing 42 and the fluid hose 44 are of respectively decreasing lengths, (see FIG. 6).

According to the heart of the invention, fluid feed means is provided, to feed an antifreeze liquid solution through hose 44 for forcible escape through fluid outlets 46 and mouth 40a towards the windshield. Moreover, heating means is further envisioned, to warm the U-casing 42 and/or the wiping element bead section 34 and/or the lips 41a, 41b, for transmitting heat by conduction to the hose 44, bead, lips and fluid in the hose. Outlets 46 are destined to be directed toward the windshield 18, for spraying the warmed anti-freeze liquid solution thereon.

More particularly, the fluid feed means preferably includes a branch line hose, 48, merging at an inner end with the intermediate section of main hose 44. Branch line 48 extends through apertures 47, 49, 50, 52 (FIG. 5) made respectively through the base wall of the metallic U-casing 42, the blade anchoring bead 34, and through linkage legs 22, 26, at a location proximate axle 28, to thereafter engage and run lengthwisely into the hollow of oscillating arm 12. The outer end of the branch line 48 escapes from arm 12 short of pivotal axle 14, to engage a through-channel 54 made in the chassis 16 of the automotive vehicle. Channel 54 eventually leads to the conventional antifreeze liquid solution tank (not shown), conventionally anchored to the automobile chassis under the hood, wherein hose 48 will operatively fluidingly connect therewith. The conventional electro-mechanical controls for actuating the spraying of anti-freeze solution on the windshield, normally through a chassis mounted nozzle proximate to the windshield pane (and operated at the automobile dash), will then be rerouted in any convenient fashion to hose 48, as will be readily understood by one skilled in the art.

The heating means includes a pair of semi-rigid metallic wires 56, 58, made from a material having a high electrical resistance so as to generate heat when an electric current runs therethrough. Each wire 56, 58 is endwisely anchored to a corresponding end of the metallic U-casing 42, through suitable weld means W or other connecting means allowing positive thermal conduction between the wire and the casing 42. Each wire 56, 58 extends through a corresponding through channel 60 thicknesswisely of the blade inner section or anchoring bead, 34, to run through the hollow of the respective legs 20, 22 towards the central axle area 28, and to escape through the hollow of arm 12 alongside hose branch 48. The wires 56, 58, follow hose 48 at its outer end, releasing arm 12 to engage the chassis channel 54. Wires 56, 58 will then eventually diverge from hose 48, so as to eventually reach and operatively connect with an electrical outlet (not shown) connected to the automobile electrical battery, in a fashion readily understood by a person skilled in the art.

Thus, a person in the car should be able to control both the antifreeze spraying means and the wiping element warming means, from inside the car by actuating knobs on the dash thereof.

Wires 56, 58 are covered along all their length by an insulating sheath 62, except at their end sections engaging with the hose casing 42. Preferably, as illustrated in FIG. 6, the insulating sheath 62 is removed from the portion of the wires 56, 58 extending thicknesswisely of the wiping element bead 34, to allow some warming of the rubber bead 34. Thus, (a) the fluid in the hose 44 can be warmed by the present warming means; and/or (b) the blade section 41a, 41b of the wiping element can be warmed by the present warming means; and/or (c) the anchoring bead of the wiping element can be warmed by the present warming means; this being direct warming action, or indirectly through conductive thermal propagation.

The wiping element 38 should be made of course from a material fluid-tight to the fluid to be sprayed on the windshield.

It would not be beyond the scope of the present invention to remove some sections of the sheath 62 about area(s) within arm 12, so that any liquid glass cleaning solution remaining within the hose branch 48 could as well be warmed to prevent freezing thereof.

That the various elements of the wiper assembly, e.g. elements 34, 38, 42, and 44 be flexible or semi-rigid or rigid is not critical, provided they are effective for the stated purposes of the wiping element:

(a) good thermal conductivity between the elements 34, 38, 42, 44, and wires 58, 60 with casing 42, is paramount, particularly between casing 42 and hose 44;

(b) the lips 41a, 41b will flexingly conform to the outwardly convex shape of the windshield glass pane, during the translational motion of the moving arm 12, to ensure suitable continuous engagement with the glass pane for even spreading of the cleaning fluid on the glass pane and eventual removal thereof.

I claim:

1. A wiping member for sweepingly cleaningly engaging a windshield pane of an automobile and for use with power means which laterally displace said wiping member over said windshield in a cyclic back and forth movement, said wiping member including:

(a) an elongated bead, to cooperate with said power means;

(b) an elongated blade, integrally dependent from said bead and defining two transversely spaced lips forming a lengthwise first channel therebetween, said first channel being generally U-shape in cross-section and defining a first flooring, merging with said bead and interconnecting said lips, the free end tips of said blade lips defining therebetween a first mouth opposite said first flooring, said lips being resilient for bendingly yieldingly engaging said windshield transversely at their tips;

(c) an elongated, thermally conductive casing, being of generally U-shape in cross-section and enclosed within said first channel and directly contacting in operative position said lips and said first flooring, said casing defining two side legs and a second flooring interconnecting said side legs thereof, a second elongated channel defined between said casing side legs, a second mouth defined by said second channel between the tips of said casing side legs opposite said second flooring, said second mouth extending short of said first mouth whereby said second channel opens into said first channel through said second mouth;

(d) heat generation means attached to said casing for heating said casing;

(e) first securing means, to fixedly secure said casing within said first channel in its said operative position;

(f) a fluid pipe, enclosed within said second channel and directly contacting in operative position said second flooring and side legs; said pipe to be force fed with a heat-vector fluid, said pipe including a number of radial through-bores for through passage of said force-fed fluid from said pipe transversely radially outwardly therefrom; said radial through-bores being in register with said second mouth to open therethrough, into said first channel, for fluid escape therefrom through said blade-mouth toward said windshield; and (g) second securing means, to fixedly secure said fluid pipe within said second channel in its said operative position; wherein said casing and said fluid pipe extend for substantially all the length of said wiping blade; said bead, blade and pipe are each made from a heat-conducting material; wherein upon energizing of said heat-generating means said casing and subsequently, said fluid pipe, blade and bead are concurrently warmed, for wiping member use in sub-freezing climates.

2. A wiping member as defined in claim 1, wherein said U-shape casing is rigid; and wherein said first securing means is defined by a shallow U-shape cavity, made about said first flooring and adjacent inner portions of said lips, whereby said casing is frictionally releasably engaged into said cavity thicknesswisely of said lips.

3. A wiping member as defined in claim 1, wherein said U-shape casing is rigid and said second channel is about as wide as the diameter of said fluid pipe; and wherein said second securing means is defined by frictional releasable engagement of said resilient fluid pipe with the side legs of said casing.

* * * * *